United States Patent
Kambe

(10) Patent No.: US 9,502,156 B2
(45) Date of Patent: Nov. 22, 2016

(54) FLAME-RETARDANT RESIN COMPOSITION

(75) Inventor: Makoto Kambe, Susono (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 13/392,241

(22) PCT Filed: Nov. 24, 2010

(86) PCT No.: PCT/JP2010/070932
§ 371 (c)(1),
(2), (4) Date: Feb. 24, 2012

(87) PCT Pub. No.: WO2011/065379
PCT Pub. Date: Jun. 3, 2011

(65) Prior Publication Data
US 2012/0145434 A1 Jun. 14, 2012

(30) Foreign Application Priority Data
Nov. 24, 2009 (JP) .................... 2009-266403

(51) Int. Cl.
*H01B 7/295* (2006.01)
*C08L 23/10* (2006.01)
*H01B 3/28* (2006.01)
*H01B 3/44* (2006.01)
*C08L 23/16* (2006.01)

(52) U.S. Cl.
CPC .............. *H01B 7/295* (2013.01); *C08L 23/10* (2013.01); *H01B 3/28* (2013.01); *H01B 3/441* (2013.01); *C08L 23/16* (2013.01)

(58) Field of Classification Search
CPC .... C08L 23/10; C08L 23/16; C08L 2666/04; H01B 7/295
USPC .......... 174/110, 110 SR; 524/115, 191, 236, 524/300, 323
See application file for complete search history.

(56) References Cited

U.S. PATENT DOCUMENTS

| | | | | |
|---|---|---|---|---|
| 4,698,379 A | * | 10/1987 | Nakaya et al. | 523/513 |
| 5,844,029 A | * | 12/1998 | Prabhu et al. | 524/236 |
| 2004/0147650 A1 | | 7/2004 | Zahalka et al. | |
| 2005/0209379 A1 | * | 9/2005 | Botkin et al. | 524/115 |
| 2007/0152201 A1 | * | 7/2007 | Zhou et al. | 252/609 |
| 2008/0167422 A1 | | 7/2008 | Hashimoto | |
| 2008/0234419 A1 | * | 9/2008 | Kambe | 524/300 |

FOREIGN PATENT DOCUMENTS

| | | |
|---|---|---|
| DE | 10 2008 011 146 A1 | 9/2008 |
| EP | 0583782 A1 | 2/1994 |
| JP | 6188041 A | 7/1994 |
| JP | 2002114878 A | 4/2002 |
| JP | 2004204193 A | 7/2004 |
| JP | 200536226 A | 2/2005 |
| JP | 20061988 A | 1/2006 |
| JP | 2006318783 A | 11/2006 |
| JP | 2007231240 A | 9/2007 |
| JP | 2008/115224 * | 5/2008 |
| JP | 2008-115224 * | 5/2008 |
| JP | 2008115224 A | 5/2008 |
| JP | 2008169273 A | 7/2008 |
| JP | 2008231317 A | 10/2008 |
| JP | 2009275132 A | 11/2009 |
| JP | 2009299052 A | 12/2009 |
| WO | WO 2009151063 A1 | 12/2009 |

OTHER PUBLICATIONS

JP 2008/115224; machine translation.*
Haworth et al. (Polymer Engineering and Science, Sep. 2000, 40(9), p. 1953-1968).*
Communication dated Mar. 1, 2011 from the International Searching Authority in counterpart international application No. PCT/JP2010/070932.
Written Opinion of the International Searching Authority dated Mar. 1, 2011 in counterpart international application No. PCT/JP2010/070932.
Office Action dated Jan. 14, 2014, issued by the German Patent and Trademark Office in counterpart German Application No. 11 2010 004 548.8.
Office Action dated Dec. 10, 2013, issued by the State Intellectual Property Office of the People's Republic of China in counterpart Chinese Application No. 201080052818.8.
Partial English Language Translation of Japanese Publication No. 2002-114878 (of record), pp. 1-19.
Partial English Language Translation of Japanese Publication No. 2005-036226 (of record), pp. 1-20.
Partial English Language Translation of Japanese Publication No. 2004-204193 (of record), pp. 1-13.
Partial English Language Translation of Japanese Publication No. 2008-115224 (of record), pp. 1-9.
Partial English Language Translation of Japanese Publication No. 2007-231240 (of record), pp. 1-9.
Office Action dated Feb. 21, 2014, issued by the Japanese Patent Office in counterpart Japanese Application No. 2009-266403.
Office Action dated Jun. 24, 2014, issued by the State Intellectual Property Office of the People's Republic of China in counterpart Chinese Application No. 201080052818.8.

* cited by examiner

*Primary Examiner* — Liam J Heincer
(74) *Attorney, Agent, or Firm* — Sughrue Mion, PLLC

(57) ABSTRACT

The present invention relates to a flame-retardant resin composition including (A) a base resin containing (A1) a propylene polymer where 90% by mass or more of constituent monomers are propylene and (A2) at least one of specific thermoplastic elastomers, (B) a metal hydrate, (C) a phenol-based antioxidant, and (D) a metal soap, wherein the blending ratio (A1):(A2) of (A1) the propylene polymer to (A2) the specific thermoplastic elastomer in (A) the base resin is 9:1 to 7:3 in terms of mass ratio; (B) the metal hydrate, (C) the phenol-based antioxidant, and (D) the metal soap each is blended in a specific amount, and (D) the metal soap contains a specific metal salt of one or more specific fatty acids in a specific amount.

14 Claims, No Drawings

FLAME-RETARDANT RESIN COMPOSITION

TECHNICAL FIELD

The present invention relates to a halogen-free flame-retardant resin composition, an electric wire using the same, and a wire harness.

BACKGROUND ART

As a material for automobiles, particularly an insulating covering material for protecting electric wires, polyvinyl chloride resin has hitherto been used. Since polyvinyl chloride is a self-extinguishing material, it has a high flame-retardancy and also is a material excellent in flexibility and abrasion resistance. However, there is a problem that the polyvinyl chloride may generate harmful halogen gasses at vehicle fire or incineration thereof and hence non-halogen-based protective materials have been developed.

In halogen-free frame-retardant resin compositions, a metal hydrate such as magnesium hydroxide or aluminum hydroxide is employed as a frame retardant. In Patent Document 1, 200 to 300 parts by mass of a metal hydrate and 5 to 60 parts by mass of zinc borate are blended into 100 parts by mass of ethylene-vinyl acetate copolymer.

PRIOR-ART DOCUMENT

Patent Document

Patent Document 1: JP-A-2006-1988

SUMMARY OF THE INVENTION

Problems that the Invention is to Solve

In general, since a metal hydrate has a low flame-retardant efficiency, it is needed to increase the blending ratio thereof to a base resin in order to satisfy a prescribed flame-retardant standard. Specifically, the metal hydrate may account for a half or more of the whole resin composition by mass. As a result, there arises a problem that mechanical properties intrinsic to the resin, such as flexibility and elongation, may decrease to a large degree.

Accordingly, an object of the invention is to provide a halogen-free flame-retardant resin composition which can solve the above conventional art problem and enhance the flame retardancy with maintaining the mechanical properties and which is also excellent in thermal resistance.

Means for Solving the Problems

The present invention provides the following flame-retardant resin composition, electric wire, and wire harness.
[1] A flame-retardant resin composition comprising:
(A) a base resin containing (A1) a propylene polymer where 90% by mass or more of constituent monomers is propylene and (A2) at least one thermoplastic elastomer of an olefin-based thermoplastic elastomer and a styrene-based thermoplastic elastomer, (B) a metal hydrate, (C) a phenol-based antioxidant, and (D) a metal soap,
wherein the blending ratio (A1):(A2) of (A1) the propylene polymer to (A2) the thermoplastic elastomer in (A) the base resin is 9:1 to 7:3 in terms of a mass ratio,
into 100 parts by mass of (A) the base resin are blended 50 to 100 parts by mass of (B) the metal hydrate, 0.5 to 4 parts by mass of (C) the phenol-based antioxidant, and 0.5 to 2 parts by mass of (D) the metal soap, and
0.1 part by mass or more of (D) the metal soap based on 100 parts by mass of (A) the base resin is a calcium salt, a magnesium salt, a zinc salt, an aluminum salt, or a lithium salt of one or more fatty acids selected from the group consisting of montanic acid, 12-hydroxystearic acid, and behenic acid.
[2] A non-halogen insulating electric wire comprising:
a twisted wire composed of a plurality of conducting wires and
an insulating cover layer provided on an outer peripheral surface of the twisted wire and containing the flame-retardant resin composition according to the above [1]. The non-halogen insulating electric wire is preferably for automobile uses (vehicle uses).
[3] A wire harness comprising:
an electric wire bundle containing a plurality of insulated electric wires and
an insulating protective material containing the flame-retardant resin composition according to the above [1], which protects an outer periphery of the electric wire bundle. The wire harness is preferably for automobile uses (vehicle uses).

Effect of the Invention

Since prescribed blending components are used in a predetermined amount in combination in the flame-retardant resin composition according to the invention, it is possible to secure flame retardancy with suppressing the blending amount of a metal hydrate that is a flame retardant as compared with that hitherto used and thus it is possible to satisfy heat-resistant long-life (thermal resistance) and also maintain good abrasion resistance and tensile elongation property. Furthermore, since the flame-retardant resin composition has a good kneading processability, an improvement in productivity is also expectable.

MODES FOR CARRYING OUT THE INVENTION

In the invention, halogen-free or non-halogen means that any halogen compound is not contained as an effective component for exhibiting various functions such as flame retardancy in the resin composition and does not mean that halogens as impurities or the like slightly contained unavoidably are also not contained.

Moreover, in the application, "% by mass" and "part(s) by mass" have the same meanings as "% by weight" and "part(s) by weight", respectively.

The flame-retardant resin composition (hereinafter also simply referred to as "resin composition") according to the invention uses at least (A1) a propylene polymer and (A2) a thermoplastic elastomer as (A) a base resin.

This (A1) propylene polymer is a polymer where 90% by mass or more of constituent monomers is propylene and can be also described as a propylene (co)polymer. Namely, it means both of a propylene homopolymer and a propylene copolymer.

As the propylene polymer, at least one kind of the homopolymers and the copolymers can be contained and, for example, one or more kinds of the homopolymers and one or more kinds of the copolymers may be used in combination.

The ratio of propylene contained in the constituent monomers of the propylene polymer, i.e., the ratio of the repeating unit derived from propylene in the propylene polymer is 90% by mass or more in view of material basic properties and chemical resistance and is preferably 95% by mass or more.

The molecular weight of the propylene polymer is not particularly limited but is preferably about 20,000 to 300,000 in view of formability. In this regard, the molecular weight is mass-average molecular weight which is measured by a GPC method and converted in terms of standard polystyrenes.

The stereoregularity of the polypropylene is not particularly limited and may be an atactic structure that is synthesized by usual radical polymerization or may be an isotactic structure or a syndiotactic structure that has stereoregularity.

The propylene copolymer is a copolymer containing copolymerization component(s) other than propylene as comonomer(s). It is sufficient that the copolymerization component(s) (comonomer(s)) other than propylene is substantially contained. From the viewpoint of flexibility, it is important that the component(s) is contained in an amount of 10% by mass or less in the constituent monomers and 5% by mass or less is more preferred.

The kind and number of the copolymerization component(s) are not particularly limited but, for example, olefins having 2 or 4 to 8 carbon atoms, (meth)acrylic acid, vinyl acetate, (meth)acrylonitrile, and the like may be mentioned. They may be used singly or a plurality of them may be used in combination. Here, (meth)acrylic acid means both of acrylic acid and methacrylic acid and the same shall apply to the designation of derivatives thereof.

The mode of copolymerization may be any of random copolymerization, block copolymerization, and graft copolymerization but a random copolymer is preferred.

As (A2) the thermoplastic elastomer, at least one of an olefin-based thermoplastic elastomer and a styrene-based thermoplastic elastomer can be used.

The olefin-based thermoplastic elastomer includes an olefin-based resin such as polyethylene or polypropylene as a hard segment and an olefin-based rubber as a soft segment. A blend type (polymer alloy) where a soft segment (domain) is finely dispersed in a matrix of a hard segment is representative but a type where a hard segment and a soft segment are copolymerized can be also used. As the olefin-based rubber, there may be mentioned ethylene-propylene rubber (EPR or EPM) and ethylene-propylene-diene rubber (EPDM). A plurality of them may be used in combination.

As commercially available products, individual products such as THERMORUN series manufactured by Mitsubishi Chemical Corporation and ESPOLEX TPE series manufactured by Sumitomo Chemical Co., Ltd. can be preferably employed.

The styrene-based thermoplastic elastomer is one obtained by block copolymerization of a hard segment of polystyrene and a soft segment of polybutadiene, hydrogenated polybutadiene (polyethylene/polybutylene), hydrogenated polyisoprene (polyethylene/polypropylene), or the like. There may be mentioned a polystyrene-based rubber obtained by block polymerization of polystyrene and polybutadiene (SBS: polystyrene-polybutadiene-polystyrene), a hydrogenated styrene-based rubber obtained by block polymerization of polystyrene and hydrogenated polybutadiene (SEBS: polystyrene-polyethylene/polybutylene-polystyrene), a hydrogenated styrene-based rubber obtained by block polymerization of polystyrene and hydrogenated polyisoprene (SEPS: polystyrene-polyethylene/polypropylene-polystyrene), and the like. A plurality of them may be used in combination.

As commercially available products, individual products such as RABALON series manufactured by Mitsubishi Chemical Corporation and ESPOLEX SB series manufactured by Sumitomo Chemical Co., Ltd. can be preferably employed.

The above (A1) propylene polymer and (A2) thermoplastic elastomer are used in combination in a mass ratio that (A1):(A2) is in the range of 9:1 to 7:3, thereby various properties being realized with better balance. Namely, flexibility is imparted by blending the olefin-based and/or styrene-based thermoplastic elastomer into the propylene polymer. On the other hand, since there is a concern that the abrasion resistance of a cured product may decrease, it is important to control the blending amount of the thermoplastic elastomer within a specific range.

The resin composition according to the invention contains the above (A1) propylene polymer and (A2) thermoplastic elastomer as essential components of the base resin but may contain resin component(s) other than them within a range where the advantages of the invention are not impaired.

For example, there may be mentioned polyolefin resins other than the propylene (co)polymers (polyethylene, ethylene/butene-1 copolymer, poly(1-butene), poly(1-pentene), poly(4-methylpentene-1), polybutadiene, polyisoprene, etc.), ethylene-vinyl acetate copolymer, ethylene-(meth)acrylate copolymer, acrylonitrile-butadiene rubber, acrylonitrile-butadiene-styrene copolymer, polystyrene, polyethylene terephthalate, polybutadiene terephthalate, polycarbonate, polyamide, petroleum resin-based hydrocarbons (petroleum resins, hydrogenated petroleum resins, terpene resins, hydrogenated terpene resins, etc.) and the like and a plurality of them may be used in combination.

In the case where these other resins are added, the amount is preferably in the range of 50 parts by mass or less based on 100 parts by mass of the sum of (A1) the propylene polymer and (A2) the thermoplastic elastomer. It can be blended in the range of 10 parts by mass or less, further preferably 5 parts by mass or less.

Into the above base resin, (B) the metal hydrate is blended as a flame retardant. The metal hydrate is a metal compound containing water molecule as crystal water and is a concept that a metal hydroxide forming a hydrated oxide is included. For example, magnesium hydroxide, aluminum hydroxide, zirconium hydroxide, calcium hydroxide, basic magnesium carbonate, hydrotalcite, and the like can be exemplified. The number of the water molecules (hydration number) contained in these metal compounds is not particularly limited and can be appropriately selected depending on the kind of the metal compound. A plurality of these metal hydrates may be used in combination.

More preferably, for example, magnesium hydroxide ($Mg(OH)_2$ or $MgO \cdot nH_2O$), aluminum hydroxide ($Al(OH)_3$ or $Al_2O_3 \cdot nH_2O$), and the like can be employed.

As the metal hydrate, one whose surface is treated (surface-covered) with a surface treating agent can be also used. Examples of the surface treating agent include long-chain fatty acids having about 12 to 25 carbon atoms (e.g., lauric acid, myristic acid, palmitic acid, stearic acid, arachidic acid, behenic acid, linoleic acid, or the like), alkali metal salts or alkaline earth metal salts of these long-chain fatty acids (e.g., magnesium salts, sodium salts, potassium salts, calcium salts, and the like of lauric acid, myristic acid, palmitic acid, stearic acid, arachidic acid, behenic acid, linoleic acid, and the like), esters of these long-chain fatty acids, chain alcohols having about 6 to 30 carbon atoms, or the like. A plurality of them may be used in combination.

The average particle diameter of the metal hydrate is not particularly limited but is preferably 0.5 to 3 μm, more preferably 1 to 2 μm from the viewpoint of material strength properties. Metal hydrates each having different average particle diameter may be used in combination. In this regard, the average particle diameter of the metal hydrate is an average primary particle diameter measured by a spectrometer and, in the case of the metal hydrate subjected to the surface treatment, the diameter means an average particle diameter after the surface treatment.

The (B) metal hydrate is contained in an amount of 50 parts by mass or more based on 100 parts by mass of (A) the base resin from the viewpoint of securing a sufficient frame retardancy, and is preferably contained in an amount of 60 parts by mass or more, more preferably 70 parts by mass or more. On the other hand, in view of maintaining a good tensile elongation property and abrasion resistance, (B) the metal hydrate is in an amount of 100 parts by mass or less, preferably 90 parts by mass or less, more preferably 80 parts by mass or less based on 100 parts by mass of (A) the base resin.

Thus, even when the blending amount of the metal hydrate is such a little amount as 100 parts by mass or less based on 100 parts by mass of the base resin, a formed product having a sufficient frame retardancy can be produced.

The (C) phenol-based antioxidant has a phenolic hydroxyl group in the molecule and is an antioxidant having an action to prevent autoxidation deterioration of polymers such as polyolefins though trapping a generated radical (ROO.). The antioxidant can be also called a hindered phenol-based antioxidant. As antioxidants, there also exist amine-based, phosphorus-based and sulfur-based ones. However, since heat-resistant long-life of the resin composition can be improved and thermal resistance can be secured over a long period of time by using the phenol-based antioxidant, the phenol-based antioxidant is used in the invention. Furthermore, as will be mentioned below, acceleration of a decrease in thermal properties caused by the contact with vinyl chloride resin can be also suppressed by using the phenol-based antioxidant.

The phenol-based antioxidant is not particularly limited as long as it exerts the above action but, for example, 2,6-di-t-butyl-4-methylphenol, n-octadecyl-3-(3',5'-di-tert-butyl-4'-hydroxyphenyl)propionate, tetrakis[methylene-3-(3,5-di-t-butyl-4-hydroxyphenyl)propionate]methane, tris(3,5-di-t-butyl-4-hydroxybenzyl)isocyanurate, 4,4'-butylidene-bis-(3-methyl-6-t-butylphenol), triethylene glycol-bis[3-(3-t-butyl-4-hydroxyl-5-methylphenyl)propionate], and the like can be exemplified. A plurality of them may be used in combination.

As commercially available products, Irganox series manufactured by Ciba Japan Inc.; for example, Irganox 1010, 1035, 1076, 1098, 1135, 1330, 1726, 1425, 1520, 245, 259, 3114, and the like can be employed.

The phenol-based antioxidant is blended in an amount of 0.5 part by mass or more based on 100 parts by mass of the base resin from the viewpoint of sufficiently preventing the oxidative deterioration of the resin. On the other hand, when too much amount is blended, there is a concern that the kneading processability of the composition may decrease, so that it is blended within the range of 4 parts by mass or less.

The (D) metal soap is preferably a salt of a medium chain fatty acid having 8 to 10 carbon atoms or a long-chain fatty acid having 12 or more carbon atoms with a metal other than sodium and potassium. As the fatty acid, there may be mentioned octylic acid, lauric acid, myristic acid, palmitic acid, stearic acid, 12-hydroxystearic acid, behenic acid, montanic acid, sebacic acid, ricinoleic acid, or the like. The fatty acid may be a dicarboxylic acid or an unsaturated carboxylic acid. As the metal, there may be mentioned lithium, magnesium, calcium, barium, zinc, aluminum, and the like.

As (D) the metal soap, further specifically, lithium stearate, magnesium stearate, calcium stearate, barium stearate, zinc stearate, calcium 12-hydroxystearate, zinc 12-hydroxystearate, magnesium 12-hydroxystearate, aluminum 12-hydroxystearate, barium 12-hydroxystearate, lithium 12-hydroxystearate, calcium behenate, zinc behenate, magnesium behenate, lithium behenate, calcium montanate, zinc montanate, mganesium montanate, aluminum montanate, lithium montanate, calcium laurate, barium laurate, zinc laurate, calcium ricinoleate, barium ricinoleate, zinc ricinoleate, zinc octylate, aluminum octylate, zinc myristate, zinc palmitate, and the like can be exemplified. They may be used singly or a plurality of them may be used in combination.

In more preferable embodiments, the fatty acid is one or more kinds selected from the group consisting of montanic acid, 12-hydroxystearic acid, and behenic acid and any metal soaps selected among calcium salts, magnesium salts, zinc salts, aluminum salts, and lithium salts of the fatty acids (they are also referred to as "special metal soaps") are employed. These metal salts can further improve the kneading processability of the resin composition and also can contribute an improvement in the frame retardancy of the resin composition. With regard to the frame retardancy-improving effect, it is presumed that the reason is that these metal soaps promote the dispersion of the metal hydrate to improve the dispersibility at high-temperature melting of the resin composition. Of these, the use of a calcium salt, a magnesium salt, a zinc salt, an aluminum salt, or a lithium salt of behenic acid is most preferred from the viewpoint of the effects to be exhibited.

The metal soap is blended in an amount of 0.5 part by mass or more based on 100 parts by mass of the base resin from the viewpoint of improving the kneading processability and frame retardancy of the resin composition. On the other hand, when too much amount is blended, there is a concern that the kneading processability of the composition may decrease contrarily, so that it is blended within the range of 2 parts by mass or less.

Furthermore, the above special metal soap is blended in an amount of 0.1 part by mass or more based on 100 parts by mass of the base resin. That is, it accounts for 20% by mass or more in the metal soap.

The resin composition according to the invention can contain, in addition to the above individual components of (A) to (D), one or more kinds of various additives to be usually used, for example, a colorant, an antioxidant, a heavy metal-deactivating agent (chelating agent), a flame retardant aid, a UV absorbent, a heat stabilizer, an antistatic agent, an antibacterial agent, an anticlouding agent, an antiblocking agent, a dispersant, a lubricant, a thickening agent, a foaming agent, an organic/inorganic filler, and the like according to needs, within a range where the advantages of the invention are not impaired. Furthermore, a known non-halogen/non-antimony flame retardant other than the above metal hydrates may be employed in combination.

The production method of the resin composition is not particularly limited and can be produced by mixing the individual components according to usual methods. For example, it is suitable to perform a method of adding a phosphate salt, a flame retardant aid and, if necessary, other optional components to a powdery or pelleted base resin component, mixing them using a tumbler, Henschel mixer, Banbury mixer, a ribbon feeder, a super mixer, or the like, and subsequently melt-kneading the resulting mixture by a single-screw or multi-screw extruder (preferably, a melt-kneading apparatus capable of deaeration), a roll, a kneader, or the like at a kneading temperature of 150° C. to 200° C., preferably 150° C. to 170° C. to form pellets or the like. The order of adding the individual components are arbitrary and the individual components may be mixed in an order different from the above-exemplified method. Furthermore, a master batch where the other additives and the like are concentrated and blended in high concentration may be formed and then it can be used for mixing.

Since the flame-retardant resin composition obtained as above can satisfy all of the flame retardancy, thermal resistance, and mechanical properties with good balance, it can be used in various uses such as electric/electronic parts, mechanical parts, vehicle parts, building materials, and office instruments. Of these, the resin composition can be suitably used as a covering material and a protective member for electric wires. Here, covering means both of primary covering of periphery of a conductor (twisted wire or core wire) and secondary covering for armoring covered electric wires. The protective member means a tube, a sheet, or the like for secondary covering for protecting electric wires/paired electric wires from abrasion. Specific method for covering electric wires using the resin composition, covering thickness, and the like are not particularly limited.

An electric wire is a covered wire where a twisted wire (bare wire) obtained by twisting a plurality of conducting wires (strands) of copper, aluminum, or the like is covered with an insulating cover layer. By using the above flame-retardant resin composition according to the invention for the insulating cover layer, a non-halogen insulating electric wire excellent in flame retardancy, long-term thermal resistance, and mechanical properties can be provided.

Namely, the non-halogen insulating electric wire according to the invention is a covered electric wire where an outer peripheral surface of the twisted wire as a conductor is covered with the resin composition according to the invention and includes a twisted wire composed of a plurality of the conducting wires and an insulating cover layer formed using the frame retardant resin composition.

The composition, diameter, and the like of the conducting wire (strand) are not particularly limited and the number of the strands constituting the twisted wire and the like are also not particularly limited. Moreover, the thickness of the cover layer is also not particularly limited but may be, for example, 0.2 to 0.3 mm.

Furthermore, it is also preferable to use the resin composition according to the invention as a tube, a tape, a sheet, or the like for secondary covering which protects the covered electric wires with bundling.

Namely, the wire harness (also called cable) according to the invention comprises an electric wire bundle containing a plurality of insulated wires and an insulating protective material containing the resin composition according to the invention which is an insulating protective material for protecting outer periphery of the electric wire bundle.

The specific configuration and the number of the insulated electric wires (covered electric wires) constituting the electric wire bundle are not particularly limited. The above non-halogen insulated electric wire according to the invention may be used as the insulated electric wire or may be used as a wire harness (or cable) where the above non-halogen insulated electric wire and a PVC-insulated electric wire covered with polyvinyl chloride (PVC) are combined and thus a plurality of non-halogen insulated electric wires and a plurality of PVC-insulated electric wires exist in combination. By combining the non-halogen insulated electric wire and the PVC-insulated electric wire, demands for processability and economical efficiency can be satisfied with suppressing the amount of harmful halogen gases to be generated. In this case, the wire harness according to the invention has a configuration which comprises an electric wire bundle containing the polyvinyl chloride-insulated electric wires and the non-halogen insulated electric wires and an insulating protective material containing the resin composition according to the invention which is an insulating protective material for protecting outer periphery of the electric wire bundle.

Since the phenol-based antioxidant is blended into the resin composition according to the above invention, the acceleration of a decrease in thermal properties caused by a PVC plasticizer can be suppressed even when the composition comes into contact with PVC of the PVC-insulated electric wire.

The insulating protective material is not particularly limited as long as it can armor the wires into one harness with bundling by any method. It may be an insulating tape with a pressure-sensitive adhesive layer or a sheet shape with a pressure-sensitive adhesive layer and may be wound on the electric wire bundle or, as a tube shape, the electric wire bundle may be inserted into the tube. The tape, sheet or tube may have a multilayer structure and it is sufficient that at least one layer thereof is constituted by the resin composition according to the invention.

The above electric wire and wire harness (cable) can be used in various uses such as electric/electronic parts, mechanical parts, vehicle parts, and building materials. Of these, the electric wire and wire harness can be preferably used as vehicle (automobile) electric wires/cables.

Examples

The following will explain the invention in more detail with reference to Examples but the invention is not limited thereto.

<Examples and Comparative Examples>

Individual components were blended into a base resin in the blending ratios shown in Tables and preliminary mixed in Henschel mixer.

The components used are as follows.

Polypropylene-based resin (polypropylene homopolymer): "PS201A" (MFR (JIS K6921-2, 230° C., 2.16 kg) 0.5 g/10 minute) manufactured by SunAllomer Ltd.

Olefin-based thermoplastic elastomer: "THERMORUN Z102B" (MFR (JIS K7210-1999, 230° C., 21.2N) 9 g/10 minute, density (JIS K7112-1999, substitution method in water) 0.88 g/cm$^3$) manufactured by Mitsubishi Chemical Corporation Magnesium hydroxide: "KISUMA 5A" (magnesium hydroxide treated with stearic acid) (average particle diameter: 1.0 μm) manufactured by Kyowa Chemical Industry Co., Ltd.

Phenol-based antioxidant: "Irganox 1010" manufactured by Ciba Japan Ltd.

Metal soap (1) (special metal soap): "MS-7" (magnesium behenate, metal content: 2.9 to 3.7% by mass) manufactured by Nitto Kasei Kogyo K.K.

Metal soap (2): calcium stearate manufactured by Kawamura Kasei Industry Co., Ltd.

TABLE 1

| Blend (part(s) by mass) | | Example 1 | Example 2 | Example 3 | Example 4 | Example 5 | Example 6 | Example 7 | Example 8 | Example 9 |
|---|---|---|---|---|---|---|---|---|---|---|
| Polypropylene resin | | 70 | 70 | 70 | 70 | 70 | 70 | 90 | 70 | 70 |
| Olefin-based thermoplastic elastomer | | 30 | 30 | 30 | 30 | 30 | 30 | 10 | 30 | 30 |
| Magnesium hydroxide | | 75 | 75 | 75 | 75 | 75 | 75 | 75 | 50 | 100 |
| Phenol-based antioxidant | | 2 | 2 | 2 | 2 | 0.5 | 4 | 2 | 2 | 2 |
| Metal soap (1) magnesium behenate | | 0.5 | 0.1 | 2 | 0.1 | 0.5 | 0.5 | 0.5 | 0.5 | 0.5 |
| Metal soap (2) calcium stearate | | | 0.4 | | 1.9 | | | | | |
| Electric wire properties | Tensile elongation | A | A | A | A | A | A | A | A | A |
| | Flame retardancy | A | A | A | A | A | A | A | A | A |
| | Abrasion resistance | A | A | A | A | A | A | A | A | A |
| | Kneading processability | A | A | A | A | A | A | A | A | A |
| | Long-term thermal resistance | passed | passed | passed | passed | passed | passed | passed | passed | passed |

TABLE 2

| Blend (part(s) by mass) | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Polypropylene resin | | 60 | 70 | 70 | 70 | 70 | 70 | 70 | 95 |
| Olefin-based thermoplastic elastomer | | 40 | 30 | 30 | 30 | 30 | 30 | 30 | 5 |
| Magnesium hydroxide | | 75 | 45 | 105 | 75 | 75 | 75 | 75 | 75 |
| Phenol-based antioxidant | | 2 | 2 | 2 | 0.3 | 4.5 | 2 | 2 | 2 |
| Metal soap (1) magnesium behenate | | 0.5 | 0.5 | 0.5 | 0.5 | 0.5 | | 3 | 0.5 |
| Metal soap (2) calcium stearate | | | | | | | 0.5 | | |
| Electric wire properties | Tensile elongation | A | A | B | A | A | A | A | A |
| | Flame retardancy | A | B | A | A | A | B | A | A |
| | Abrasion resistance | B | A | B | A | A | A | A | A |
| | Kneading processability | A | A | B | A | B | B | B | B |
| | Long-term thermal resistance | passed | passed | not passed | not passed | passed | passed | passed | passed |

Using each of the obtained resin compositions, periphery of a twisted wire composed of a copper wire was covered in a thickness of 0.2 mm to produce a non-halogen insulated electric wire of 0.35 sq.

For the resin compositions or the non-halogen insulated electric wires, the following tests were performed. Evaluation results are shown in Tables 1 and 2.

<Tensile Elongation>

In accordance with JIS K 7161 (1993), a press sheet having a thickness of 1 mm punched out into a dumbbell No. 3 shape was used as a test piece. A tensile rate was set at 50 mm/minute. The sample showing an elongation rate of 300% or more was evaluated as "A" and the sample showing an elongation rate of less than 300% was evaluated as "B".

<Flame Retardancy>

For the non-halogen insulated electric wire, a flame-retardant test was performed in accordance with ISO 6722 (2006). The sample which put the flame out within 70 seconds was evaluated as "A" and the sample which did not put the flame out within 70 seconds was evaluated as "B".

<Abrasion Resistance>

In accordance with ISO 6722 (2006), abrasion resistance of the non-halogen insulated electric wire was investigated. The sample showing no conduction after the number of reciprocation times was 300 or more was evaluated as "A" and the sample where the number of reciprocation times was less than 300 until conduction was observed was evaluated as "B".

<Kneading Processability>

After the resin composition was pre-blended using a high-speed mixing apparatus such as Henschel mixer beforehand, it was kneaded using a single-screw kneader. The temperature condition was set so as to be a temperature of melting point of the blend composition plus 20° C. The sample showing an injection amount of 50 g/minute or more was evaluated as "A" and the sample showing an injection amount of less than 50 g/minute was evaluated as "B".

<Long-Term Thermal Resistance>

In accordance with ISO 6722 (2006), long-term thermal resistance of the non-halogen insulated electric wire was investigated. The sample showing no crack was evaluated as "passed" and the sample where any crack was confirmed was evaluated as "not passed".

In the case where the resin compositions of Examples were used, it was confirmed that they were excellent in all the properties evaluated. On the other hand, in the resin compositions of Comparative Examples, it was revealed that any one or more of the properties became bad.

While the invention has been described in detail and with reference to specific embodiments thereof, it will be apparent to one skilled in the art that various changes and modifications can be made therein without departing from the spirit and scope thereof. The present application is based on a Japanese patent application filed on Nov. 24, 2009 (Application No. 2009-266403), and the contents are incorporated herein by reference.

INDUSTRIAL APPLICABILITY

Since the flame-retardant resin composition of the present invention can satisfy all of flame retardancy, thermal resistance, and mechanical properties with good balance, it can be used in various uses such as electric/electronic parts, mechanical parts, vehicle parts, building materials, and office instruments.

The invention claimed is:

1. A flame-retardant resin composition comprising:
   a base resin containing a polypropylene homopolymer having a melt flow rate (MFR) at 230° C. of 0.5 g/10 minute and an olefin-based thermoplastic elastomer having a melt flow rate (MFR) at 230° C. of 9 g/10 minute,
   a metal hydrate comprising magnesium hydroxide,
   a phenol-based antioxidant, and
   a metal soap,
   wherein the blending ratio of the propylene homopolymer to the thermoplastic elastomer in the base resin is 7:3 in terms of a mass ratio,
   into 100 parts by mass of the base resin are blended 75 to 100 parts by mass of the metal hydrate, 2 parts by mass of the phenol-based antioxidant, and 0.5 to 2 parts by mass of the metal soap, and
   0.1 to 0.5 parts by mass of the metal soap based on 100 parts by mass of the base resin is magnesium behenate.

2. The flame-retardant resin composition according to claim wherein the metal hydrate is treated with a surface treating agent.

3. The flame-retardant resin composition according to claim 2, wherein the surface treating agent comprises a long-chain fatty acid having 12 to 25 carbon atoms or an ester, an alkali metal salt or an alkaline earth metal salt thereof.

4. The flame-retardant resin composition according to claim 2, wherein the surface treating agent comprises a chain alcohol having 6 to 30 carbon atoms.

5. The flame-retardant resin composition according to claim 1, wherein the metal hydrate has an average particle diameter of 0.5 to 3 μm.

6. The flame-retardant resin composition according to claim 1, wherein the metal soap comprises a combination of two different compounds.

7. The flame-retardant resin composition according to claim 6, wherein the metal soap comprises magnesium behenate and calcium stearate.

8. The flame-retardant resin composition according to claim 1, wherein the metal hydrate further comprises aluminum hydroxide.

9. The flame-retardant resin composition according to claim 1, wherein the phenol-based antioxidant comprises tetrakis[methylene-3-(3,5-di-t-butyl-4-hydroxyphenyl)propionate]methane.

10. The flame-retardant resin composition according to claim 1, wherein the magnesium behenate has a metal content of 2.9 to 3.7% by mass.

11. A non-halogen insulated electric wire for automobiles comprising:
    a twisted wire composed of a plurality of conducting wires and
    an insulating cover layer provided on an outer peripheral surface of the twisted wire and containing the flame-retardant resin composition according to claim 1.

12. A wire harness for automobiles comprising:
    an electric wire bundle containing a plurality of insulated electric wires and
    an insulating protective material containing the flame-retardant resin composition according to claim 1, which protects an outer periphery of the electric wire bundle.

13. A flame-retardant resin composition comprising:
    a base resin containing a polypropylene homopolymer having a melt flow rate (MFR) at 230° C. of 0.5 g/10 minute, and an olefin-based thermoplastic elastomer having a melt flow rate (MFR) at 230° C. of 9 g/10 minute,
    magnesium hydroxide,
    a phenol-based antioxidant, and
    magnesium behenate,
    wherein the blending ratio of the propylene polymer to the thermoplastic elastomer in the base resin is 9:1 to 7:3 in terms of a mass ratio,
    into 100 parts by mass of the base resin are blended 75 to 100 parts by mass of the metal hydrate, 0.5 to 2 parts by mass of the phenol-based antioxidant, and 0.1 to 0.5 parts by mass of magnesium behenate.

14. The flame-retardant resin composition according to claim 13, wherein into 100 parts by mass of the base resin are blended 2 parts by mass of the phenol-based antioxidant,
    and the blending ratio of the propylene polymer to the thermoplastic elastomer in the base resin is 7:3 in terms of a mass ratio.

* * * * *